US012385881B2

(12) United States Patent
Balasubramanian et al.

(10) Patent No.: US 12,385,881 B2
(45) Date of Patent: Aug. 12, 2025

(54) INTEGRATED THERMOCOUPLE WAVEGUIDE SENSOR SYSTEM AND METHOD TO MEASURE PHYSICAL PROPERTIES OF WAVEGUIDE MATERIAL AND SURROUNDINGS

(71) Applicant: INDIAN INSTITUTE OF TECHNOLOGY MADRAS (IIT MADRAS), Chennai (IN)

(72) Inventors: Krishnan Balasubramanian, Chennai (IN); Suresh Periyannan, Warangal (IN)

(73) Assignee: INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 458 days.

(21) Appl. No.: 17/634,511

(22) PCT Filed: Jul. 7, 2020

(86) PCT No.: PCT/IN2020/050592
§ 371 (c)(1),
(2) Date: Feb. 10, 2022

(87) PCT Pub. No.: WO2021/028937
PCT Pub. Date: Feb. 18, 2021

(65) Prior Publication Data
US 2022/0291171 A1    Sep. 15, 2022

(30) Foreign Application Priority Data
Aug. 14, 2019    (IN) .............................. 201941032842

(51) Int. Cl.
*G01N 29/22* (2006.01)
*G01K 7/02* (2021.01)
(Continued)

(52) U.S. Cl.
CPC .............. *G01N 29/222* (2013.01); *G01K 7/02* (2013.01); *G01N 29/02* (2013.01); *G01N 29/024* (2013.01);
(Continued)

(58) Field of Classification Search
CPC .... G01N 29/222; G01N 29/02; G01N 29/245; G01N 29/2468; G01N 2291/022;
(Continued)

(56) References Cited

U.S. PATENT DOCUMENTS 2,707,391 A * 5/1955 McSkimin ........... G01N 11/162
73/54.27
6,047,602 A * 4/2000 Lynnworth ............. G01F 1/662
73/632
(Continued)

FOREIGN PATENT DOCUMENTS

| WO | WO-2015008299 A2 * | 1/2015 | ........... G01N 29/024 |
| WO | WO-2015099884 A2 * | 7/2015 | ............. F02D 35/02 |
| WO | 2016162880 A1 | 10/2016 | |

OTHER PUBLICATIONS

International Search Report and Written Opinion for International Application No. PCT/IN2020/050592, mailed Oct. 14, 2020, 8 pages.

*Primary Examiner* — Laura Martin
*Assistant Examiner* — Philip L Cotey
(74) *Attorney, Agent, or Firm* — Morgan, Lewis & Bockius LLP

(57) ABSTRACT

The present invention discloses an integrated thermocouple waveguide sensor system with one or more of compatible wave propagation mediums joined at one junction with at least one ultrasonic energy transducer on at least one open end of one or more wave guides and a method using the integrated thermocouple waveguide sensor system with arrangement of at least one waveguide thermocouple for
(Continued)

integrated measurement of multiple and simultaneous physical properties of the waveguide material itself and that of the surrounding media using the Seebeck phenomena and the ultrasonic guided wave phenomena. The surrounding media properties and waveguide material properties are measured based on the ultrasonic waveguide parameters and the temperature is measured by the thermocouple.

11 Claims, 14 Drawing Sheets

(51) Int. Cl.
  *G01N 29/02* (2006.01)
  *G01N 29/024* (2006.01)
  *G01N 29/032* (2006.01)
  *G01N 29/07* (2006.01)
  *G01N 29/11* (2006.01)
  *G01N 29/24* (2006.01)
(52) U.S. Cl.
  CPC .......... *G01N 29/032* (2013.01); *G01N 29/07* (2013.01); *G01N 29/11* (2013.01); *G01N 29/245* (2013.01); *G01N 29/2468* (2013.01); *G01N 2291/022* (2013.01); *G01N 2291/02809* (2013.01); *G01N 2291/02818* (2013.01); *G01N 2291/02827* (2013.01); *G01N 2291/02836* (2013.01); *G01N 2291/101* (2013.01)
(58) Field of Classification Search
  CPC .......... G01N 2291/02809; G01N 2291/02818; G01N 2291/02827; G01N 2291/02836; G01N 2291/101; G01N 29/024; G01N 29/032; G01N 29/07; G01N 29/11; G01K 7/02
  USPC .......................................................... 73/644
  See application file for complete search history.

(56) References Cited

U.S. PATENT DOCUMENTS

| | | | |
|---|---|---|---|
| 6,296,385 B1* | 10/2001 | Balasubramaniam | G01N 11/16 374/142 |
| 10,352,778 B2* | 7/2019 | Larsen | F02D 35/02 |
| 2014/0331771 A1* | 11/2014 | Baba | G01B 21/085 73/597 |
| 2016/0153938 A1* | 6/2016 | Balasubramaniam | G01N 29/11 73/579 |
| 2016/0273973 A1* | 9/2016 | Larsen | G01K 13/02 |
| 2017/0176265 A1* | 6/2017 | DeSilva | G01K 7/427 |

* cited by examiner

FIG. 6A  FIG. 6B  FIG. 6C  FIG. 6D

INTEGRATED THERMOCOUPLE WAVEGUIDE SENSOR SYSTEM AND METHOD TO MEASURE PHYSICAL PROPERTIES OF WAVEGUIDE MATERIAL AND SURROUNDINGS

CROSS-REFERENCE TO RELATED APPLICATIONS

The present application is the national stage of International Patent Application No. PCT/IN2020/050592, filed on Jul. 7, 2020, which claims the benefit of and priority to Indian Patent Application No. 201941032842 filed on Aug. 14, 2019, both of which are incorporated herein by reference in their entirety.

FIELD OF INVENTION

The present disclosure relates to sensors systems. More particularly to an integrated thermocouple waveguide sensor system and sensing method for simultaneously measuring the physical properties of the wave propagation medium, rheology measurement of its surrounding fluids and condition monitoring of its surrounding media.

BACKGROUND OF THE INVENTION

The following on the background of the invention is intended only to facilitate an understanding of the present invention.

Waveguides of various kinds are widely used for the propagation of waves like electromagnetic, microwaves, ultrasonic, optical etc., To measure the physical properties of the waveguide materials and preferably even the physical properties of the surrounding medium, various techniques are employed to measure elastic moduli of the wave guides, temperature in and around the wave guide, in-line ultrasonic viscometer, distributed temperature sensors. The ultrasonic guided waves are used to design the sensors for measuring flow rates, dynamic elastic modulus etc., The reflections of the ultrasonic vibrations generated by ultrasonic transducers are transmitted through the waveguide and the reflected echoes of these are processed to determine the measured value of various parameters. A transducer can be a transmitter and a receiver of ultrasonic energy. So, a continuous voltage waveform cannot be used. If such a waveform is used, the transducer would always function as a transmitter. Since the internally generated sound waves are stronger than the returning echoes, the returning signal is lost in the noise of the system. To overcome this problem, transducers are used in pulse mode where the voltage waveform consists of many pulses each separated by a fixed distance and time. The transducer functions as transmitter during pulse excitation and as a receiver during the time interval between pulses. Further damping of the ultrasound waves increase the resolution of the reflected echoes.

To measure temperature, Seebeck effect is used extensively. Seebeck phenomenon is one of the thermoelectric effects which teaches the production of an electromotive force (emf) and consequently an electric current in a loop material consisting of at least two dissimilar conductors when two junctions are maintained at different temperatures. It is used to measure temperature with great sensitivity and accuracy. So, this is one of the most common method for measurement of temperature.

Apart from the normal use of distinct compatible metals for thermocouple, the US patent US20110277803A1 discloses ink compositions comprising metal, that is printed to form thermocouple and used to measure temperature at a point.

Further, the published literature "Design of Seebeck coefficient measurement probe for powder library" by Kenjiro Fujimoto et. al. discloses a PC-based measurement instrument that comprise a probe of two chromel Alumel™ thermocouples, where one thermocouple is able to control its own temperature to ensure a temperature difference between thermocouples.

Rheological properties measurement of oils are an impartment studies in the oil making industries. For example, cloud point refers to the temperature below which wax or bio wax in oils (coconut oil, diesel, bio-diesels) forms a cloudy appearance. Due to the presence of the solidified waxes (at cloud point) thickens the oil and clogs the injectors and fuel filters in engines. Similarly, the flow properties of oils are dependent on the pour point of oils. Oil loses its flow characteristics when the oil becomes semi-solid due to high paraffin content precipitated. In any oil, has a high pour point is generally associated with a high paraffin content due to the effect of low temperature. Hence, wax crystallization is a major problem because it may result in the transportation of oils during production, plugging of wellbores and manufacturing facilities.

While the combination of two waveguides in a junction mode will produce the Seebeck effect and behave like thermocouple, it may provide only information for measuring the surrounding temperatures and not measure the physical properties of it's surrounding medium (fluids/solids) such as viscosity, pour point, cloud point, longitudinal, lateral and diagonal strains, etc. Hence, a developed novel technique is needed to measure the physical properties of the surrounding medium using ultrasonic waves propagating in the waveguide(s) in addition to temperature using the Seebeck effect.

Hence, there is need for an integrated sensor that measures the physical properties of the wave propagation medium as well as its surroundings, temperature and even rheological properties for certain applications.

The shortcomings of the prior art are overcome, and additional advantages are provided through the invention and method of present disclosure

OBJECT OF THE INVENTION

The main object of the invention is to provide an integrated sensor for simultaneously measuring the wave propagation medium for its physical properties, rheology measurement and condition monitoring of surrounding media.

Another object is to provide a method for simultaneously measuring the wave propagation/wave leakage medium for its physical properties, rheology measurement and condition monitoring of surrounding media.

SUMMARY OF THE INVENTION

This invention describes an integrated thermocouple waveguide sensor system comprising of one or more of compatible wave propagation mediums joined at one junction with at least one ultrasonic energy transducer at the one open end of one or more wave guides and a method using the integrated thermocouple waveguide sensor system with arrangement of at least one waveguide thermocouple for integrated measurement of multiple and simultaneous physical properties of the waveguide material itself and that of the surrounding media using the Seebeck phenomena and the ultrasonic guided wave phenomena. The surrounding media properties and waveguide material properties is measured based on the ultrasonic waveguide parameters along with temperature.

BRIEF DESCRIPTION OF THE DRAWINGS AND FIGURES

It is to be expressly understood, that each of the following figures is provided for the purpose of illustration and description only and is not intended as a definition of the limits of the present disclosure.

Also depicts the connection of Ultrasonic source (PZT—101) transmitter/receiver position for connecting with the waveguide. (102 & 103) PZT polarization direction. (104 & 105) dissimilar metals 1 and 2 of the thermocouple-waveguide sensor or wave propagation mediums. Hot junction (HJ), (106, 107) Ultrasonic wave reflectors (bend and notch embodiments). (108A, 108B, 108C) Region of Seebeck effect generators. (109) Gage length of ultrasonic sensor.

FIG. 3 (a) Schematic of the setup using integrated sensor with bent thermocouple, (b) A-scans signals collected from the thermocouple wires, and (c) & (d) Shows the δTOF's response from Chromel and Alumel™ wires vs. thermocouples readings respectively.

FIG. 4 (a & b) shows an integrated sensor connected to the longitudinal transducer in pulse-echo/through transmission techniques and obtained A-scan signal correspondingly.

Figure 5:
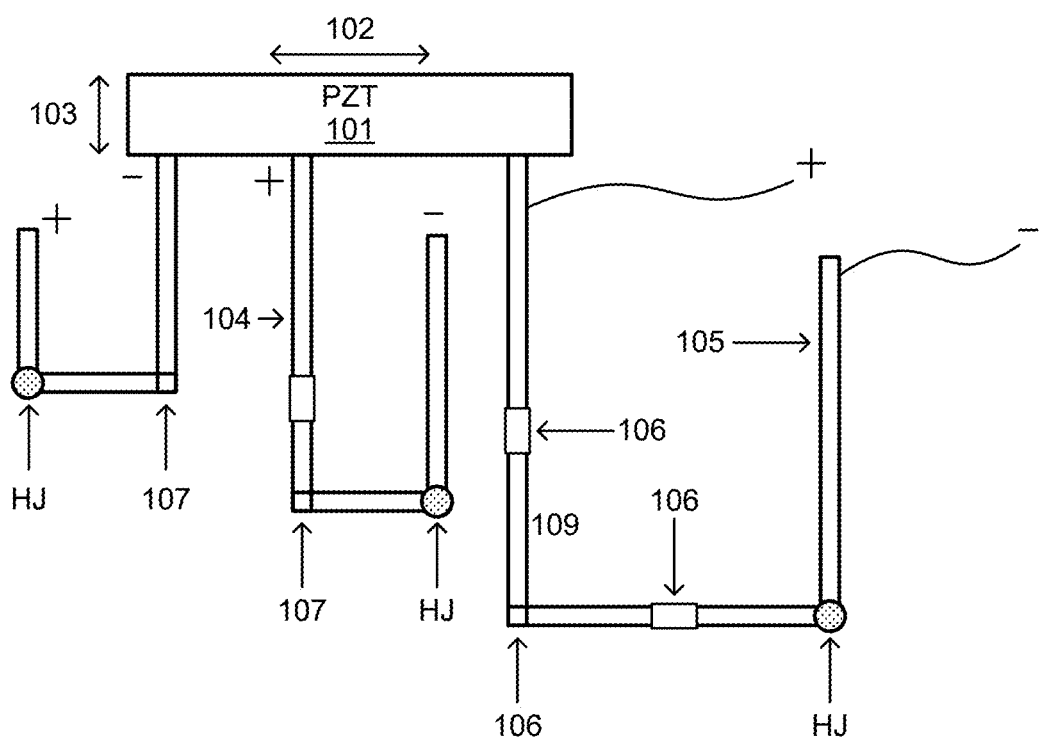

FIG. 5 Illustration of thermocouple-waveguide concept in single bend, multiple bend sensors using single thermocouple and multiple thermocouple for multiple sensors respectively.

FIG. 6 (a-d) Thermocouple wires for different Cases (FIGS. 6A-6D) of embodiments,
  (e) A-scans signals obtained from the corresponding Cases (FIGS. 6A-6D) and
  (f) Enlarged A-scan signals from the main signals (FIGS. 6A-6D).

FIGS. 7(a & b) shows the multiple bend thermocouple (twisted)-waveguide (Chromel) and the A-scan signal respectively and (c) Shows the $\varepsilon_u$ vs. Temperature response collected from different gauge lengths of Chromel ultrasonic sensors from the welded and twisted type of thermocouple-waveguides respectively.

Figure 8A:
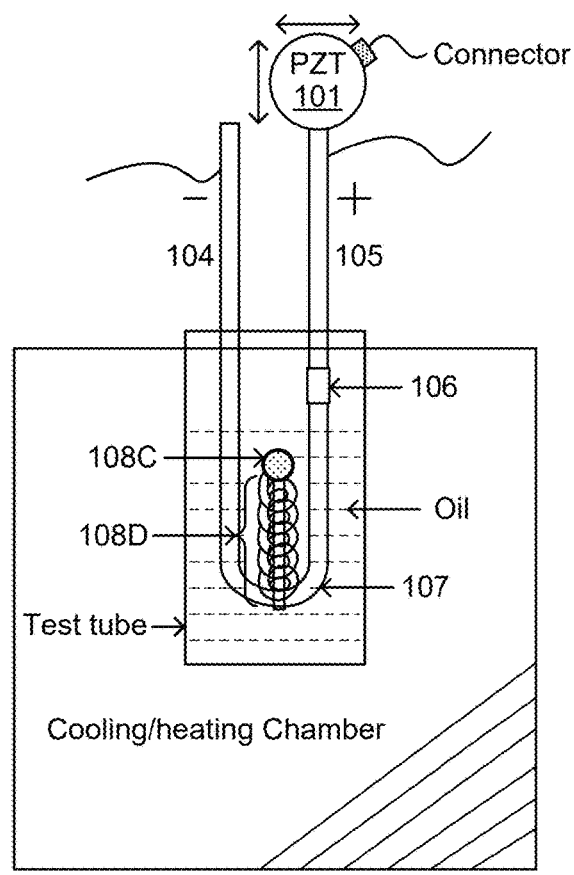

FIG. 8(a). Schematic of the setup for fluid rheology measurement wherein 104 and 105 are wave propagation medium and oil is the wave leakage medium. (b) A-scan obtained from the thermocouple-ultrasonic sensor and observed the different wave modes as marked in the A-scan and that corresponding temperature (32° C.) measured.

Figure 9A:
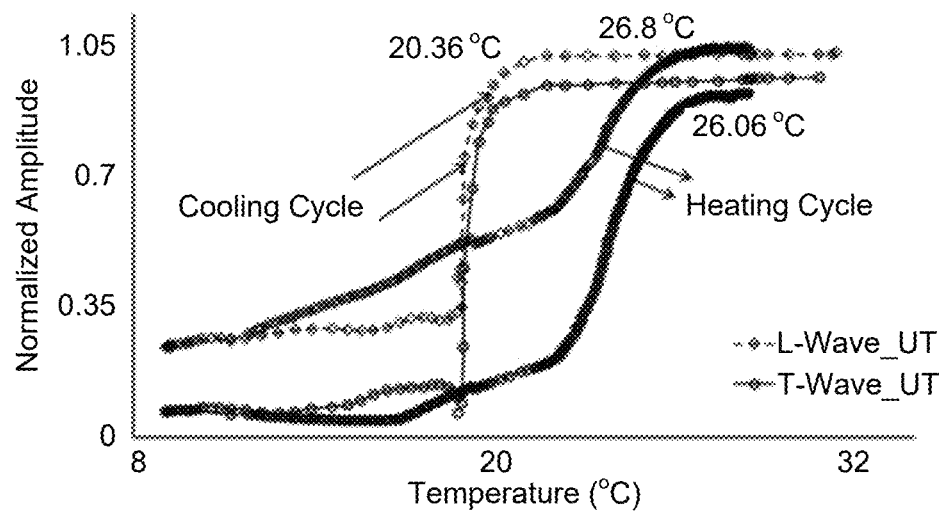
Figure 9B:
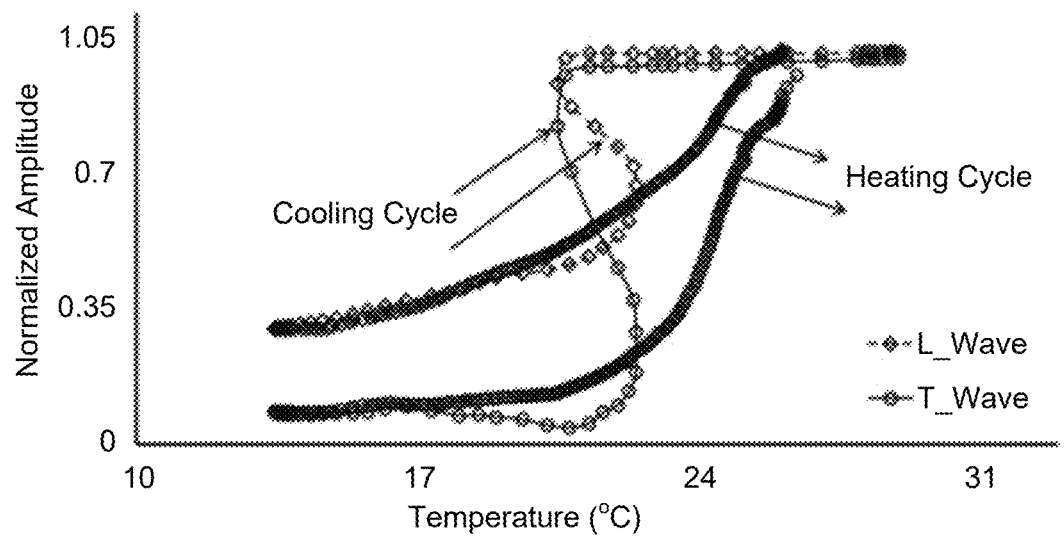

FIG. 9 (a) Shows the coconut oil behaviour as function of temperature (15 ice cubes were used, each ice cube (rectangular shape made from 11 ml of water) filled in the cooling chamber at 4 min interval for faster cooling cycle experiment in one case)

(b) Shows the coconut oil behaviour as function of temperature. (15-16 ice cubes were used in this experiment. Each rectangular ice cube made from 8 ml of water).

Figure 10:
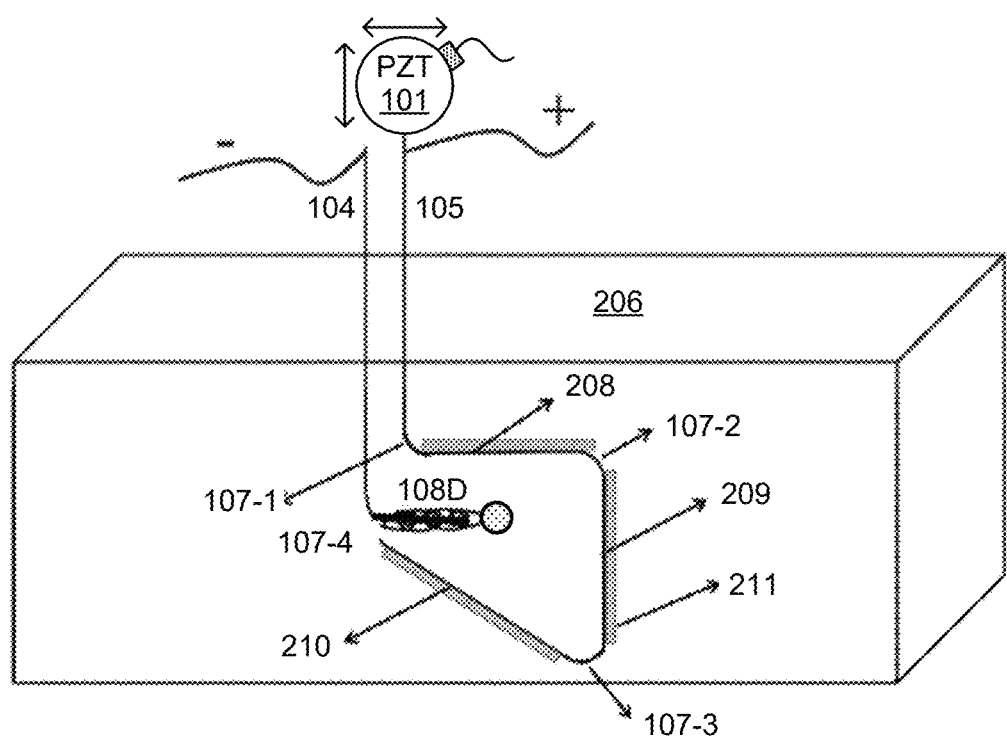

FIG. 10 depicts integrated thermocouple waveguide sensor for strain measurement secured to a rectangular bar (206) using high temp pastes or welds—211

Figure 11:
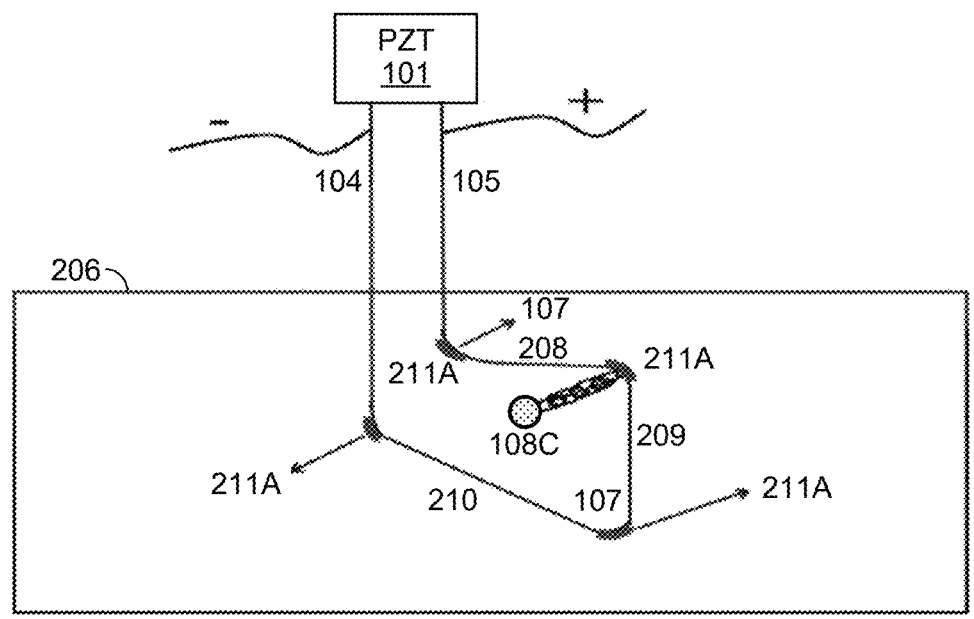

FIG. 11 Depicts integrated thermocouple waveguide sensor for strain measurement secured to a specimen (206) using spot welds or high temp glues—211A.

Figure 12A:
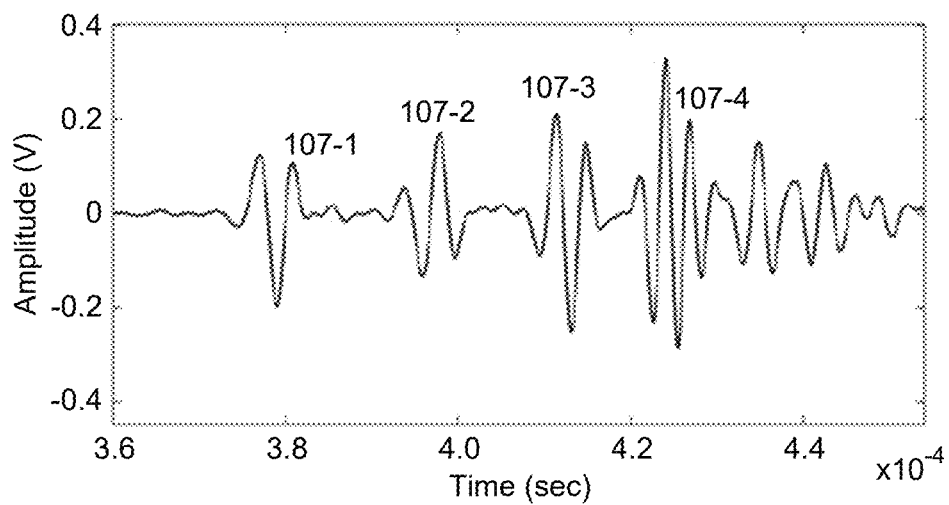
Figure 12B:
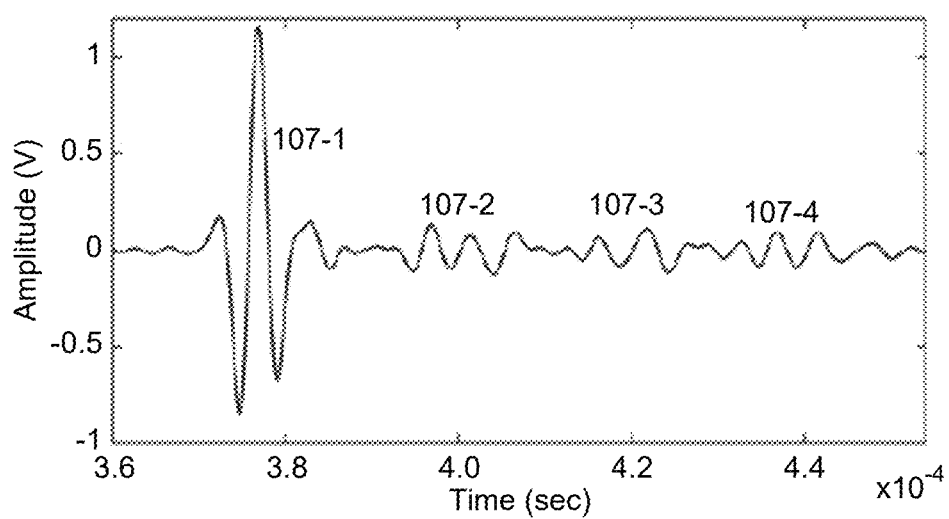

FIGS. 12 (a) and (b). Shows the reflected signals obtained from each bend, before fixing and after fixing on the MS plate respectively.

Figure 13:
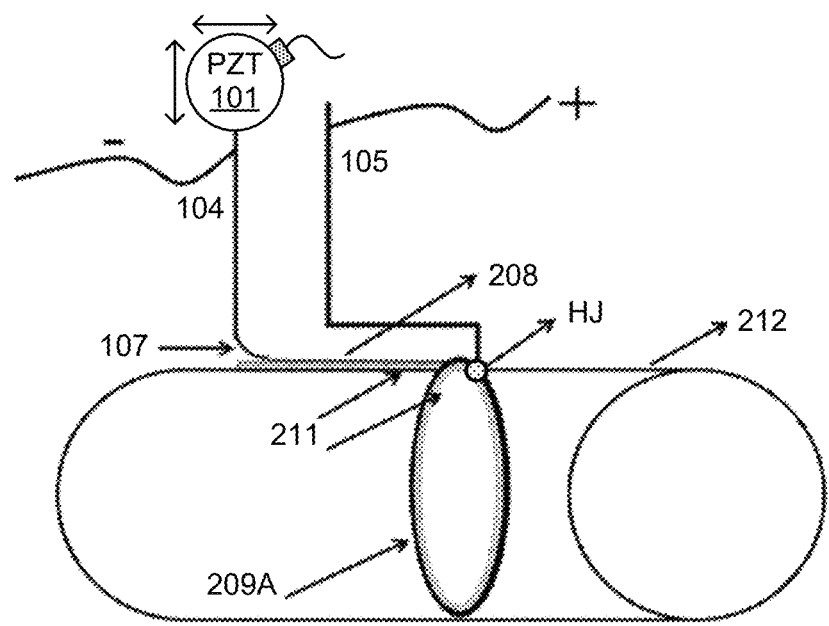

FIG. 13 Depicts integrated thermocouple waveguide sensor for strain measurement secured in the cylindrical specimen (212).

Figure 14:
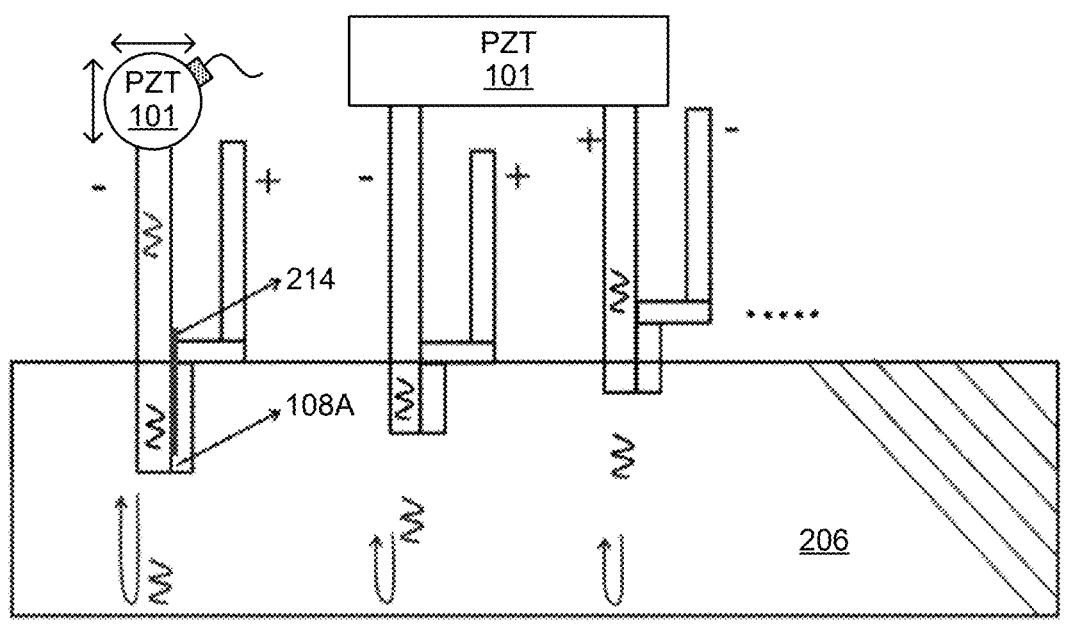

FIG. 14 depicts Integrated thermocouple waveguide sensors are inserted inside the rectangular bar (206) at different offset positions for measuring the strains, while heating the sample.

DETAILED DESCRIPTION

The foregoing has broadly outlined the features and technical advantages of the present disclosure in order that the detailed description of the disclosure that follows may be better understood. Additional features and advantages of the disclosure will be described herein after which form the subject of the claims of the disclosure. It should be appreciated by those skilled in the art that the conception and specific aspect disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. The novel features and characteristic of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the following details of the accompanying drawings. One or more embodiments are described in the later part, by way of example, with reference to the accompanying drawings.

All publications, patents and patent applications cited herein, whether supra or infra, are hereby incorporated by reference in their entirety to the same extent as if each individual publication, patent and patent application is specifically and individually indicated to be incorporated by reference.

Unless defined otherwise, all technical and scientific terms used herein have the same meaning as commonly understood by one of ordinary skill in the art to which the invention pertains.

Rheology: The branch of physics that deals with the deformation and flow of matter, especially the Newtonian and non-Newtonian flow of liquids and the plastic flow of solids.

Seebeck effect: The Seebeck effect is the phenomenon in which a temperature difference between two dissimilar electrical conductors or semiconductors produces a voltage difference between the two substances.

Data acquisition (DAQ): It is the process of measuring an electrical or physical phenomenon such as voltage, current, temperature, pressure, or sound with a computer. A DAQ system consists of sensors, DAQ measurement hardware, and a computer with programmable software.

δTOF: It is defined as the change in time of flight at the measurement temperature compared to the time of flight at room temperature.

$\varepsilon_u$: It is defined as the time of flight ratio/ultrasonic ratio is used to calibrate the multiple waveguide sensors for obtaining a single slope of curve or an empirical equation.

Wave propagation medium: Is the solid/hollow and circular/non-circular cross sectioned medium through which the wave propagates, which is also termed as waveguide in certain parts of the document.

Longitudinal axisymmetric wave mode is denoted by L(0,m). Similarly torsional axisymmetric wave mode is denoted by T(0,m) and Flexural wave mode F(n,m).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Accordingly, the present invention describes an integrated thermocouple wave guide sensor system using arrangement of at least one waveguide thermocouple for integrated measurement of multiple and simultaneous physical properties of the waveguide material itself and that of the surrounding media using the Seebeck phenomena and the ultrasonic guided wave phenomena. The surrounding media properties (viscosity, density, temperature, humidity, flow, level, etc.) and wave propagation medium properties (elastic moduli, longitudinal, lateral strains, diagonal strains, etc.,) can be measured based on the ultrasonic waveguide parameters and also, the temperature is measured by the thermocouple.

In one embodiment, two dissimilar metals (Chromel and Alumel™) were joined together to make two junctions (hot junction was the region of interest and the cold junction was connected to electronic devices including an ultrasonic transducer).

The ultrasonic energy was created by supplying electrical energy to a PZT based transducer. The transducer produces mechanical vibrations which generate the ultrasonic waves. These waves were transmitted to the waveguide medium and the received response (mechanical vibrations) from the waveguide was the collected by the same PZT (pulse echo mode) due to its reversible property. Simultaneously, the Seebeck effect was observed by measuring the electromotive force (electric potential) at the hot junction.

The change in ultrasonic velocity, amplitude of ultrasonic signal and the change in electromotive force (emf) were observed when using the integrated waveguide sensor (dissimilar metals) at different temperatures.

Further, physical properties include those of the surrounding medium include the rheological properties, cloud point or wax appearance point, pour point, density, flow, level, viscosity, mono/polymerization behavior (hysteresis) of fluids, fluid tank/pipeline pressure, magnetic and electric fields, chemical concentrations such as chemical composition, reactions, and vibrations at different temperature.

In a preferred embodiment, an integrated thermocouple waveguide sensor system comprising one or more of compatible wave propagation mediums(104,105) joined at one junction with an ultrasonic energy transducer (101) on the open end of one or more wave guides; wherein the sensor system comprises of one or more reflectors such as bends, notches, coatings and Bragg gratings, along the length of one or more of wave guides to obtain ultrasonic reflections, wherein the joint at the junction (108A-C) is made by one or more of twisting, bending, bonding, extended welding, spot welding to provide ultrasonic damped junction, electrical potential and mechanical strength; wherein the system is used to measure physical properties of the wave propagation medium and its surrounding medium including rheology and strain parameters using ultrasonic waves propagating in the waveguide(s) in addition to temperature;

In an embodiment, the ultrasonic energy transducer comprises one or more of ultrasonic generator and ultrasonic receiver.

In another embodiment the ultrasonic energy transducer (101) comprises either of ultrasonic generator and ultrasonic receiver or both.

In an embodiment, the means of ultrasonic energy transduction method in various embodiments is selected from piezo-electric, electromagnetic, magneto strictive, thermo-elastic, opto-mechanical, electro-mechanical, or a combination thereof.

In a preferred embodiment, the wave propagation mediums comprise Chromel and Alumel™ or any other compatible materials/thermocouples.

In an embodiment the wave propagation medium has one of circular and non-circular cross section.

In another embodiment, the wave propagation medium is one of a solid and hollow.

In preferred embodiment, the temperature tolerance for sensing ranges from −100° C. to 2000° C.

In yet another embodiment, the sensor system comprises one or more of pre-defined reflector such as bends, notches, coatings and Bragg gratings, along the length of one or more of wave guides to obtain ultrasonic reflections.

In one embodiment, the sensor system is used to continuously monitors the parameters.

In another embodiment, the physical properties include those in the surrounding medium like viscosity, density, temperature, humidity, flow, level, including the rheological properties, cloud point or wax appearance point, pour point, density, flow, level, viscosity, mono/polymerization behavior (hysteresis) of fluids, fluid tank/pipeline pressure, magnetic and electric fields, chemical concentrations such as chemical composition, reactions, and vibrations at different temperature, In yet another embodiment, the wave propagation medium properties like elastic moduli, elastic moduli of the wave leakage/attenuating, deformations of wave propagation medium longitudinal, lateral strains, diagonal strain, mechanical deformations "linear, lateral, diagonal and resultant strains, coefficient of thermal expansion, stress" of wave leakage medium can be measured based on the ultrasonic waveguide parameters and also, the local temperature in linear, lateral, diagonal or resultant directions of wave propagation/leakage medium is measured by the thermocouple;

In a preferred embodiment, a method of measuring physical properties of the wave propagation medium and its surrounding medium including rheology and strain parameters using ultrasonic waves propagating in the waveguide (s) in addition to temperature using the integrated thermocouple waveguide sensor system comprise,
   a. taking two or more of wave propagation mediums of at least two dissimilar metals with one or more reflectors,
   b. joining two dissimilar wave propagation mediums at one end for a thermocouple and optionally, making one or more thermocouples,
   c. placing an ultrasonic energy transducer at the non-joined end of one or more of the wave propagation mediums,
   d. arranging and securing the integrated thermocouple waveguide sensor in contact or embedded in the area of interest,
   e. maintaining temperature difference between the joined and free ends of wave propagation mediums,
   f. transmitting ultrasound waves from the ultrasonic energy transmitter,
   g. receiving reflections of the ultrasonic waves and,
   h. processing the received data to display the desired parameters,
   Wherein joint at the junction of two dissimilar end made at step (b) by one or more of twisting, bending, bonding, extended welding, spot welding to provide ultrasonic damped junction electrical potential and mechanical strength.

In another embodiment of this method, ultrasonic waves is transmitted or received in one or more of longitudinal, torsional, flexural, shear modes of ultrasound in the integrated sensor.

Accordingly the integrated thermocouple waveguide sensor system of this invention comprises of a new configuration and a junction at the end of a thermocouple to provide an ultrasonic damped junction as well as hot junction and simultaneously measure the Seebeck effect and ultrasonic parameters (time of flight (TOF), amplitudes, attenuations and frequency characterizations) of the guided wave modes, that can be generated using appropriate transduction mechanisms (using ultrasonic electronics and cold junction electronics are coupled together) at the each starting end of the wave propagation mediums, either in Pulse Echo (PE) or Through Transmission (TT) or both modes, to provide multiple simultaneous and co-located measurements of the wave propagation medium physical properties and the wave leakage medium properties and also monitoring the surrounding media. The other end of the two wave propagation mediums is short circuited (hot j unction) along with special configurations, thus can be functioned as an emf generator and mechanical/ultrasonic damper.

The integrated thermocouple waveguide sensor comprises joining at least two dissimilar metals to make at least two junctions. While the combination of two waveguides in a junction mode will produce the Seebeck effect and behave like thermocouple, it may provide only information for measuring the surrounding temperatures and not measure the physical properties of its surrounding medium (fluids/solids) such as viscosity, pour point, cloud point, longitudinal, lateral and diagonal strains, etc. Hence, the method comprises measurement of the physical properties of the surrounding medium using ultrasonic waves propagating in the waveguide(s) in addition to temperature using the Seebeck effect.

The ultrasonic waves are created by supplying electrical energy to an ultrasonic transducer which produces mechanical vibrations to generate the ultrasonic waves. These waves were transmitted to the waveguide medium and the received response in form of mechanical vibrations from the waveguide are collected by the same ultrasonic transducer due to its reversible property. Simultaneously, the Seebeck effect is observed by measuring the electromotive force (electric potential) at the hot junction.

The change in ultrasonic velocity, amplitude of ultrasonic signal and the change in electromotive force (emf) are observed, by using the integrated waveguide sensor on the dissimilar metals at different temperatures.

Figure 1:
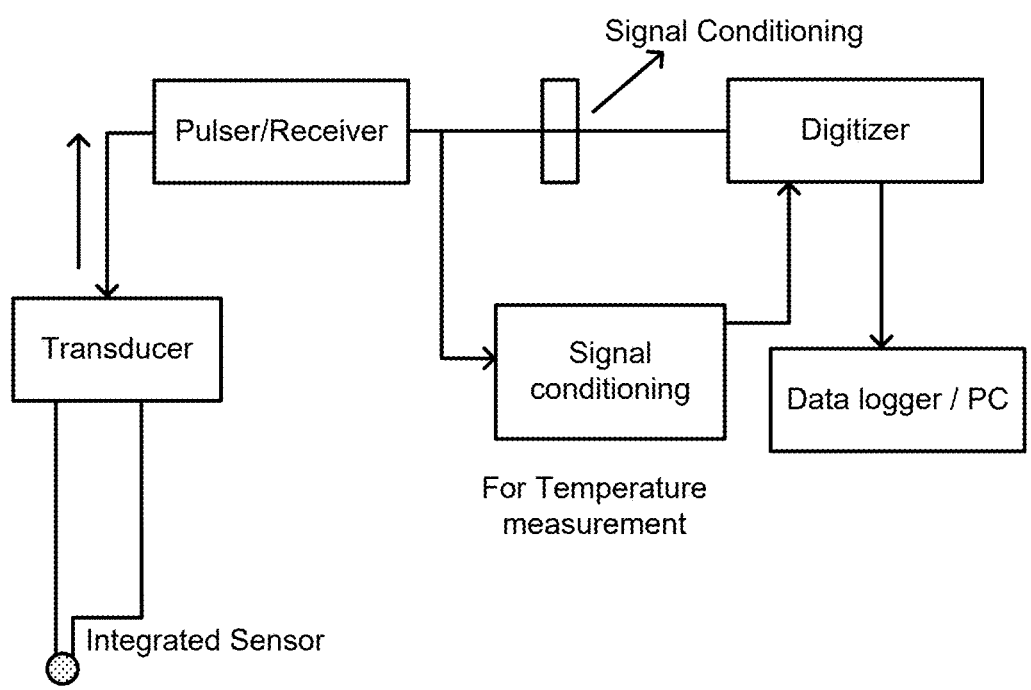
FIG. 1 Shows the schematic diagram of the integrated sensor waveguide system.
Figure 2A:
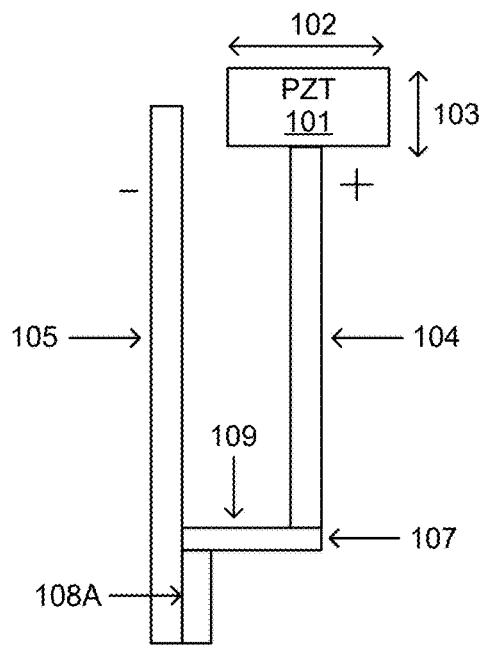
FIG. 2 Depicts various methods of joining process for making the hot junction (HJ) such as methods: (a) resistance weld (108A), (b) twisting of wires (108B), (c) welded (butt-weld 108C) wires with a single wire of twist (single helix ultrasonic damper 109C) and (d) insulated wires (using an insulation 109D) were twisted and but-welded (108C) at end, 108D dual helix damper.
Figure 2B:
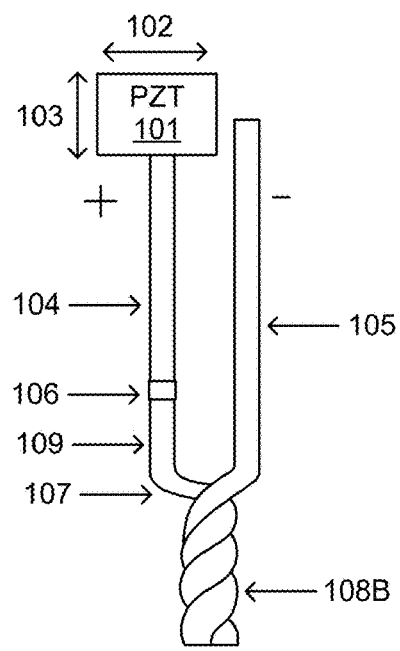
Figure 2C:
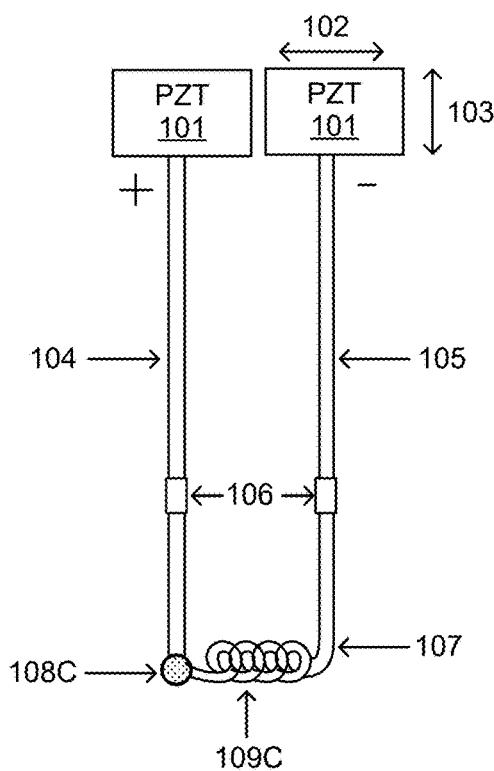
Figure 2D:
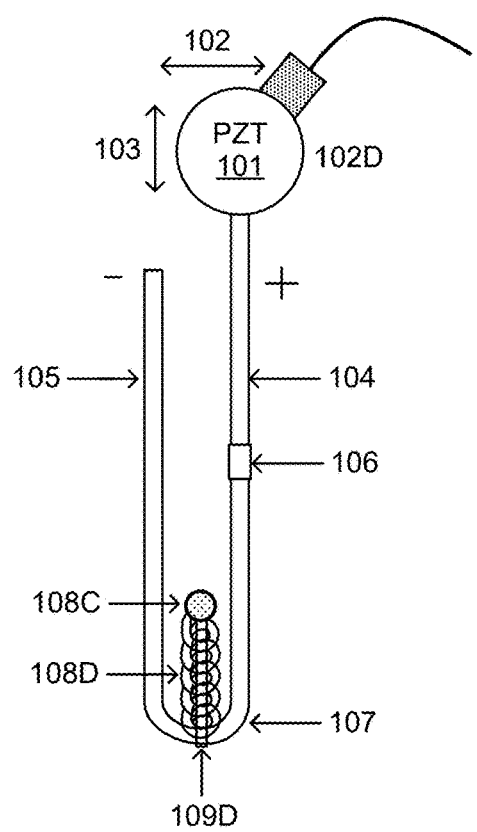

FIG. 1 shows an illustrative diagram of an exemplified embodiment of an approach to make the hot junction in the integrated sensor. The hot junction is an important part when developing an ultrasonic thermocouple waveguide-based sensor. The junction between the two waveguides is created by joining two dissimilar metals by attaching, elongated welding, twisting the ends of two waveguides, introducing a helix in addition to a spot weld or any similar mechanism that will allow for the Seebeck effect to be measured and simultaneously enable damping of the ultrasonic wave modes that may be reflected from this junction.

Further exemplified embodiments depicting various methods of joining the dissimilar metals to promote the damping of the ultrasonic wave mode are illustrated in FIGS. 2(a-d).

Figure 3A:
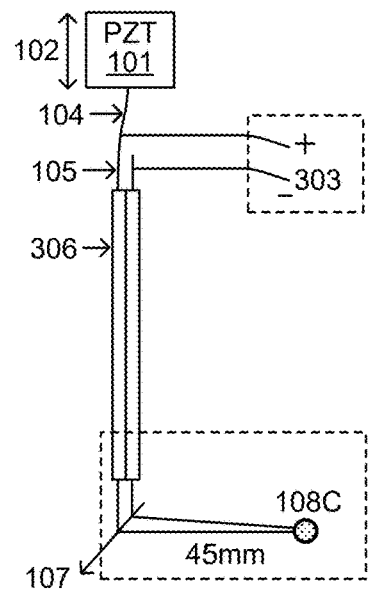

In a preferred exemplified embodiment, a welded thermocouple made of Chromel and Alumel™ is initially used to develop an ultrasonic waveguide sensor as shown in FIG. 3(a). A single bend embodiment is made near the hot junction of the thermocouple. This configuration functioned as an ultrasonic bent waveguide sensor (when one or both dissimilar metals are connected to an ultrasonic transducer) as well as a thermocouple. Insulated wires are used to connect the positive (Chromel +ve, also acting as a waveguide) and negative (Alumel™) terminals of the thermocouple wires to temperature measurement DAQ card (cold junction electronics) for measuring the temperature as shown in FIG. 3(a). A couple of clips are used to avoid any damage in the waveguide. An insulation tube (Alumina) are used to isolate the thermocouple wires. Chromel wire (across cross section) are connected perpendicular to the longitudinal transducer for generating/receiving s L(0, 1) mode in the bent waveguide. A thin layer of couplants (silicone grease) is used with Teflon tape (thin) between the transducer and the waveguide. The dimensions of the waveguides and the bend length of these embodiment are shown in FIG. 3(a, b). The A-scan signals (FIG. 3(b)) are obtained from two embodiments with—(i). Chromel wire and (ii). Alumel™ wire acting as the waveguide. Simultaneously, the room temperature is obtained from the thermocouple.

Figure 3B:
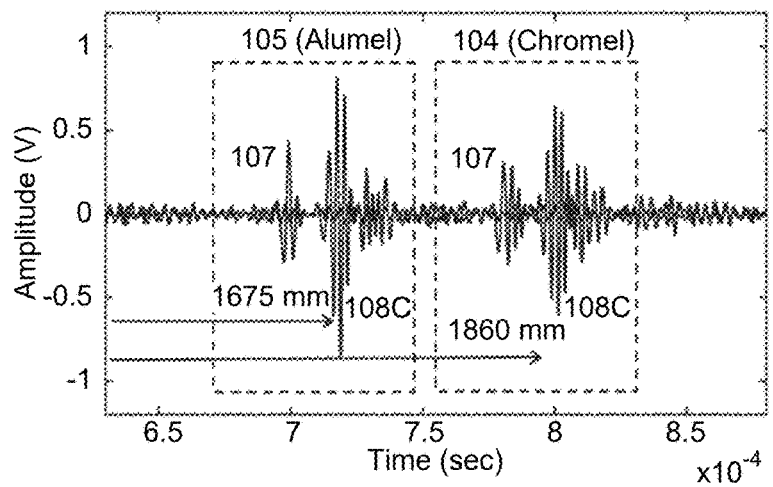
Figure 3C:
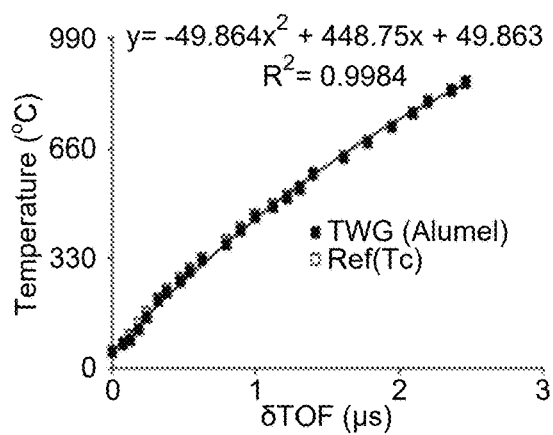
Figure 3D:
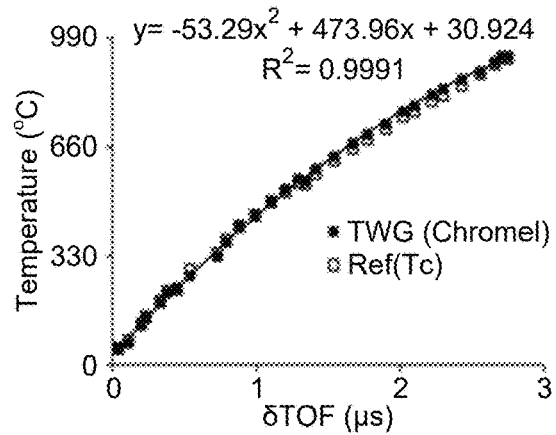

Further the δTOF (change in time of flight) is measured in the Chromel waveguide horizontal region (gauge length) of interest at different temperatures and plotted together with the output from a thermocouple-waveguide (TWG) and another co-located thermocouple (Tc) positioned near the bend region as shown in FIG. 3(c). After that, the similar heating trial is conducted using Alumel™ wire acting as a bent waveguide from the thermocouple and the data is shown in FIG. 3(d).

Figure 4A:
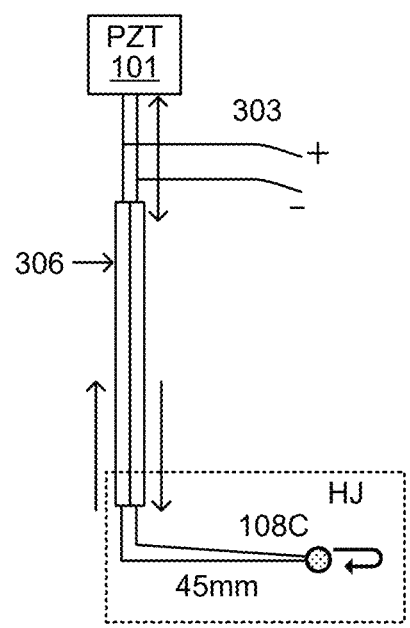
Figure 4B:
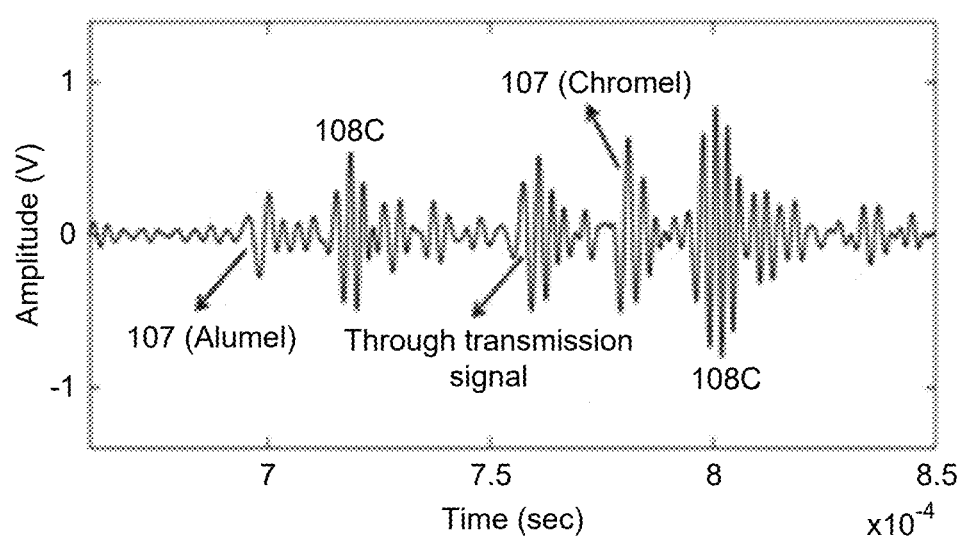

FIG. 4(a) shows the schematic view of the integrated sensor in pulse-echo/through transmission approach and the obtained A-signal is shown in FIG. 4(b).

The method of measuring physical properties of the wave propagation medium and its surrounding medium including rheology and strain parameters using ultrasonic waves propagating in the waveguide(s) in addition to temperature using the integrated thermocouple waveguide sensor system comprise, taking two or more of wave propagation mediums of at least two dissimilar metals, joining two dissimilar wave propagation mediums at one end forming one or more thermocouples, placing an ultrasonic energy transducer at the non-joined end of one or more of the wave propagation mediums, maintaining temperature difference between the joined and free ends of wave propagation mediums, transmitting ultrasound waves from the ultrasonic energy transmitter, receiving reflections of the ultrasonic waves, processing the data to display the desired parameters.

The invention is now illustrated by various examples and accompanying drawings, which are not meant to limit the scope of the invention in any manner. All embodiments that may be obvious to a skilled person would fall within the scope of the present invention.

Example 1

Construction of the Integrated Single/Multiple (Bend/Notch) Sensor

A single thermocouple can be used to make a single ultrasonic sensor (using bend/notch) or multiple ultrasonic sensors (bends/notches) resulting in an integrated sensor system. Similarly, multiple thermocouples could be connected to a single transducer in order to make multiple integrated sensors (FIG. 5). Each end of the integrated sensor waveguide is fabricated with a single hot junction either using weld or twist. Ultrasonic signals were reflected from periodically spaced bend or notch embodiments in the waveguides. The instantaneous time of flight difference ($\delta$TOF) between these reflections (embodiments) can be measured at different temperatures.

FIG. 5 also depicts a different embodiment of the sensors using single thermocouple and multiple thermocouple for multiple sensors aligned in a row/column.

Example 2

Designing Integrated Sensor Using Welded Type Hot Junction

In this experimental setup, a welded thermocouple is initially used to develop an ultrasonic waveguide sensor as shown in FIG. 3(a). A single bend embodiment is made near the hot junction of the thermocouple. This configuration functioned as an ultrasonic bent waveguide sensor (when Chromel or Alumel™ wires (d=1.2 mm) or both connected to an ultrasonic transducer) as well as a thermocouple.

Insulated wires are used to connect the positive (Chromel +ve, also acting as a waveguide) and negative (Alumel™) terminals of the thermocouple wires to temperature measurement DAQ card (cold junction electronics) for measuring the temperature as shown in FIG. 3(a). Here, a couple of clips are used to avoid any damage in the waveguide. An insulation tube (Alumina) is used to isolate the thermocouple wires.

Chromel wire (across cross section) is connected perpendicular to the longitudinal transducer for generating/receiving L (0,1) mode in the bent waveguide. A thin layer of couplants (silicone grease) is used with Teflon tape (thin) between the transducer and the waveguide. The dimensions of the waveguides and the bend length used in these experiments are shown in FIG. 3(a, b).

The A-scan signals (FIG. 3(b)) were obtained from two experiments—(i). Chromel wire and (ii). Alumel™ wire acting as the waveguide. Simultaneously, the room temperature is observed from the thermocouple.

A heating experiment is also conducted using bent thermocouple with a Chromel wire acting as the waveguide. The $\delta$TOF is measured in the Chromel waveguide horizontal region (gage length) of interest at different temperatures and plotted together with the output from a thermocouple-waveguide (TWG) and another collocated thermocouple (Tc) positioned near the bend region as shown in FIG. 3(c). After that, the similar heating trial is conducted using Alumel™ wire acting as a bent waveguide from the thermocouple and the data is shown in FIG. 3(d). The schematic view of the integrated sensor in pulse/echo or through transmission approach and the obtained A-signal is shown in FIG. 4.

Example 3

Figure 6E:
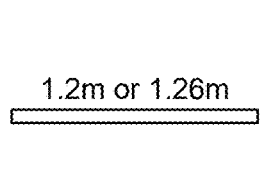
Figure 6E:
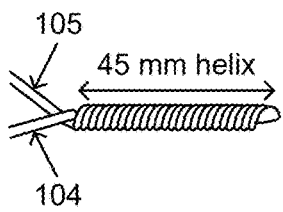
Figure 6E:
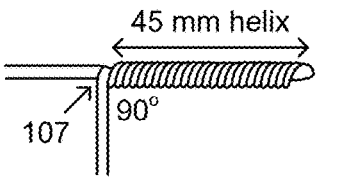
Figure 6E:
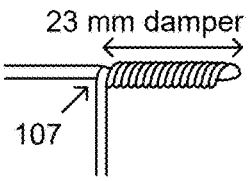
Figure 6E:
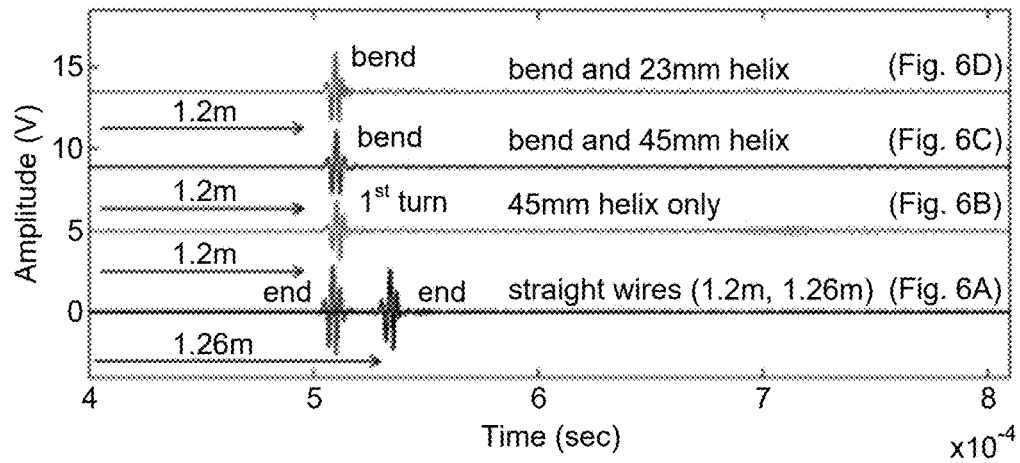
Figure 6F:
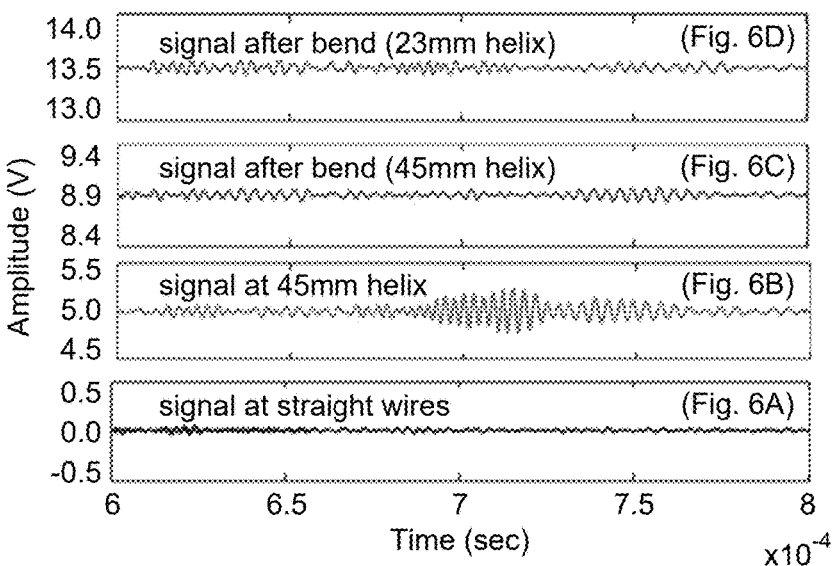

Validation of Ultrasonic Damper Using Twisted Type Hot Junction and Bend Configuration Different configurations of the integrated sensor are developed from the plain waveguide as shown in FIGS. 6(a)-6(d). Each case, the A-scan signal is obtained compared to each other as shown in FIG. 6(e). The strength of ultrasonic signals reflections is verified, while introducing the different free length of hot junction as well as providing 90° bend embodiment. The strength of signal is enlarged from main signal as shown in FIG. 6(f), particularly it is significant when the joint junction is 45 mm helix. It is evident that the ultrasonic signals damping is based on the hot junction (helix structure) and bend embodiments. It is clearly observed strength of signal, that's enlarged from main signal as shown in FIG. 6(f).

Example 4

Design of Multiple Bent Integrated Sensor Using Twisted Type Hot Junction

Figure 7A:
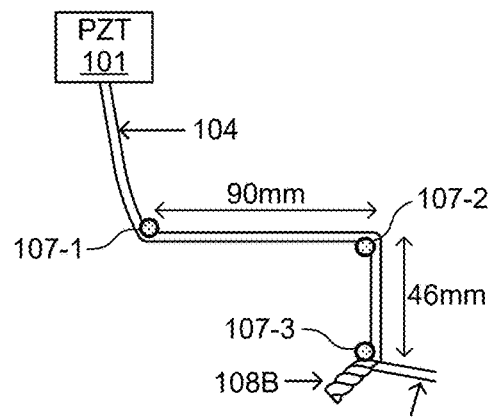
Figure 7B:
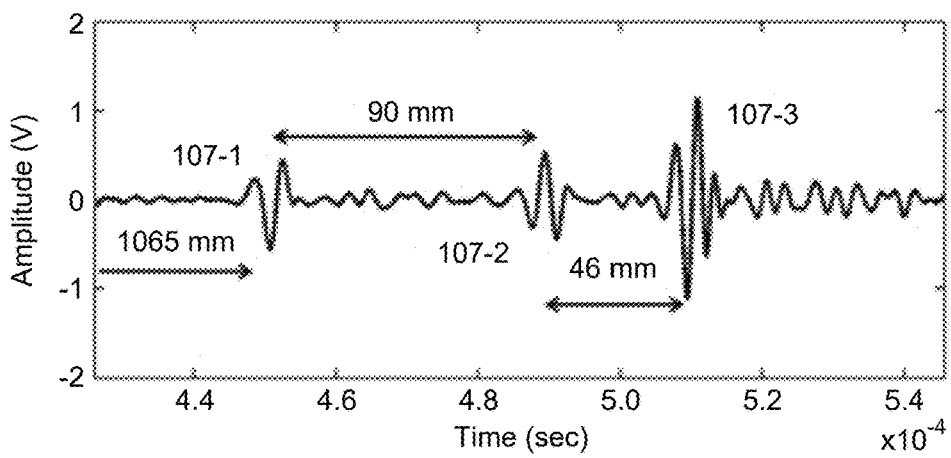

A single thermocouple is used to develop the multiple waveguide sensors along with the twisted type hot junction as shown in FIG. 7(a). Three bend embodiments were used in the K-type thermocouple. This configuration functioned as an ultrasonic sensor (a Chromel wire (d=1.2 mm) is connected to a 0.5 MHz longitudinal transducer) as well act as a thermocouple. The multiple bent integrated sensors were positioned in a particular plane (uniform temperature region) inside the hot chamber. The dimensions of the waveguide and the bend lengths (gage lengths) used in this experiment is shown in FIG. 7(a). A-scan signal obtained from the multiple bent integrated sensor waveguide (Chromel) is shown in FIG. 7(b). Simultaneously, the inside furnace temperature is observed from the thermocouple.

Figure 7C:
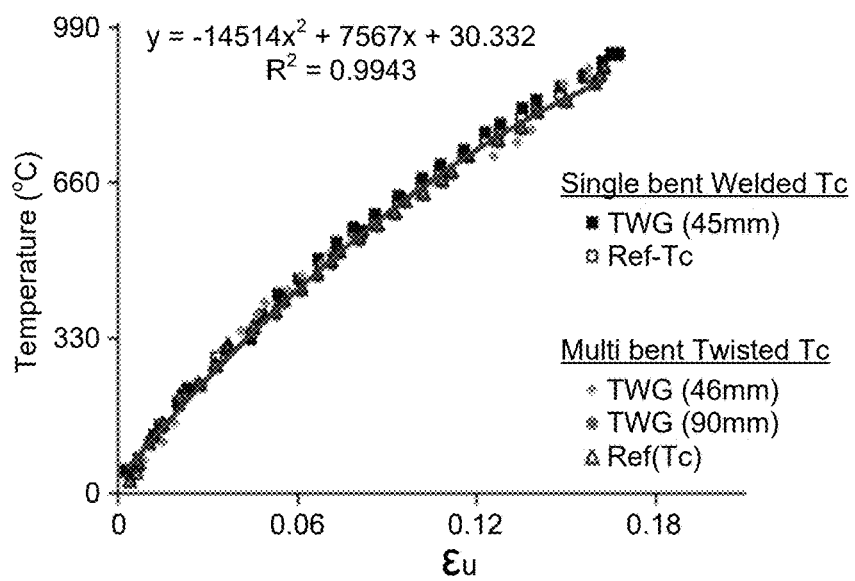

A heating experiment is conducted using this setup. Each bend region (gage length 46 mm, 90 mm) of time of flight ratio ($\varepsilon_u$) is measured at different temperatures and plotted together with the outputs from the integrated sensor waveguide and another reference thermocouple (Tc) is shown in FIG. 7(c). Here, the $\varepsilon_u$ concept is used to calibrate the waveguide sensors.

Finally, the welded and the twisted type integrated sensor waveguide data were compared and it is observed that the results were similar to each other as is shown in FIG. 7(c).

Example 5

Rheology Measurement of Fluids Using Integrated Sensor

Rheological properties measurement of oils is an impartment studies in the oil making industries. For example, cloud point refers to the temperature below which wax or bio wax in oils (coconut oil, diesel, biodiesels) forms a cloudy appearance. Due to the presence of the solidified waxes (at cloud point) thickens the oil and clogs the injectors and fuel filters in engines.

Similarly, the flow properties of oils are dependent on the pour point of oils. Oil loses its flow characteristics when the oil becomes semi-solid due to high paraffin content precipitated. In any oil, has a high pour point is generally associated with a high paraffin content due to the effect of low temperature. Hence, wax crystallization is a major problem because it may result in the transportation of oils during production, plugging of wellbores and manufacturing facilities.

In this experiment coconut oil is used to obtain rheological properties the pour, cloud point temperatures and to track the oil characteristics due to the effect of poly/mono crystallizations behaviour as function of temperatures. Ice cubes are used for studying the oil behaviour as function of temperature. 15 ice cubes were used, each ice cube (rectangular shape made from 11 ml of water) filled in the cooling chamber at 4 min interval for faster cooling cycle experiment in one case and 15-16 ice cubes made from 08 ml of water in another case.

Figure 8B:
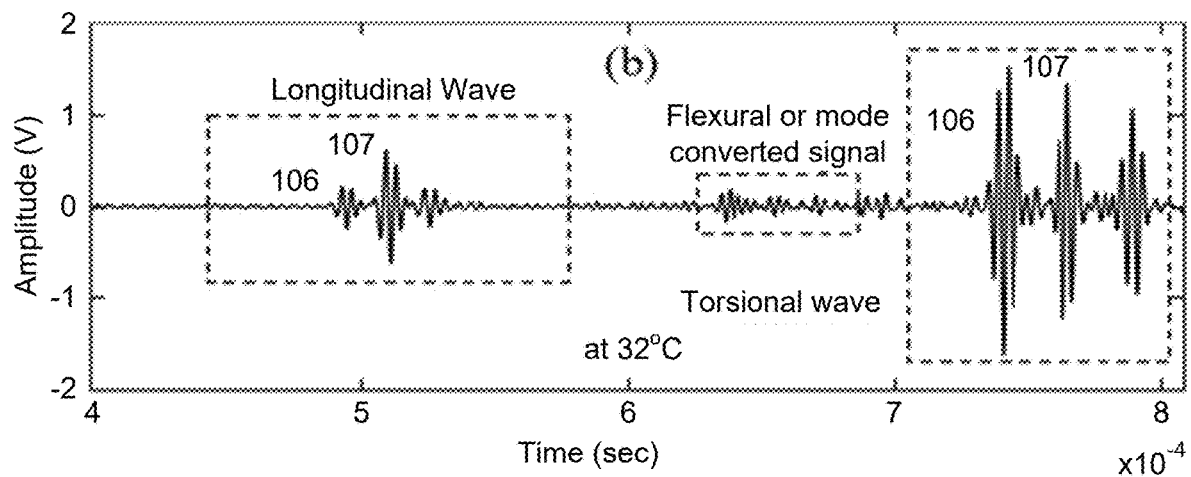

The setup is shown in FIG. 8(a). The ultrasonic reflection coefficient and temperatures are obtained simultaneously from ultrasonic-thermocouple sensor, upon introducing the sensor into the oil. The temperature is measured based on the point effect as well as integrated effects of an Ultrasonic-Thermocouple waveguide sensors FIG. 8(b). The pour point of 30 mm thickness or 5 to 6 ml coconut oil has been observed at 20° C. to 23° C. range and this value closely matched to the pour point of the coconut oil (21° C. to 24° C.) as per ASTM D97 method. The rheological properties of oil change based on rate of cooling, when the oil is subjected to different rate of cooling cycle is shown in FIGS. 9 (a) & 9 (b).

Example 6

Strain Measurement Using an Integrated Sensor

For strain measurement using an integrated sensor, the following experiments are conducted.
1. The integrated sensor is pasted (using high temp pastes or welds—211) to a rectangular specimen (206) in the manner as depicted in FIG. 10 to measure the longitudinal (208), lateral (209) and diagonal (210) strains, while heating the sample. The hot junction is made with damper and weld.
2. In another experiment, as depicted in FIG. 11, the integrated sensor is pasted (using spot welds or high temp glues—210, 211A) to the specimen (206) for measuring the longitudinal strain (208), lateral strain (209), resultant strains (210) and thermal expansion, while heating the sample. The hot junction made with damper and weld. FIGS. 12 (a) & 12(b) shows the reflected signals obtained from each bend, before fixing and after fixing on the mild steel plate.
3. In next experiment, the integrated sensor is pasted to the cylindrical specimen (212) and the longitudinal strain (208), lateral/radial strain (209A), are measured while heating the sample. The hot junction (HJ) made by weld bead. The detail is depicted in FIG. 13.
4. FIG. 14 depicts the details of the experiment with multiple integrated sensors inserted inside the rectangular specimen at different offset positions for measuring the strains, while heating the sample. Here, a region (214) of the sensor is insulated and the hot junction made by continuous resistance weld (108A). Multiple ultrasonic sensors can be embedded into the thermocouple wires, either +ve or −ve terminals of the thermocouple. Here, ultrasonic sensors distributed along the length of the +ve or −ve terminals or both at distances/spacings that can either be uniform or arbitrary.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

REFERENCES

1. J. C. Pandey, M. Raj, S. N. Lenka, P. Suresh, and K. Balasubramaniam, Measurement of Viscosity and Melting Characteristics of Mould Powder Slags by Ultrasonics. Iron-making and Steelmaking, Vol. 38, 74-79, (2011).
2. P. Suresh and K. Balasubramaniam, Moduli Determination at Different Temperatures by an Ultrasonic Waveguide Method. Experimental Mechanics, Vol. 56 1257-1270 (2016).
3. P. Suresh and K. Balasubramaniam, Simultaneous Moduli Measurement of Elastic Materials at Elevated Temperatures using an Ultrasonic Waveguide Method. Review of Scientific Instruments, Vol. 86, 114903 (2015).
4. P. Suresh and K. Balasubramaniam, Multi-Level Temperature measurements using Ultrasonic guided waves, Measurement, Vol. 61, 185-191 (2015).
5. P. Suresh, and P. Rajagopal and K. Balasubramaniam, Ultrasonic Bent Waveguides Approach for Distributed Temperature Measurement. Ultrasonics, Vol. 74, 211-220 (2017).
6. P. Suresh, and K. Balasubramaniam and P. Rajagopal, Robust Ultrasonic Waveguide based Distributed Temperature Sensing. Physics Procedia, Vol. 70, 514-518 (2015).
7. P. Suresh, P. Rajagopal and K. Balasubramaniam, Re-configurable Multi-Level Temperature Sensing by Ultrasonic "Spring-like" Helical Waveguide. Journal of Applied Physics, Vol. 119, pp. 144502, (2016).
8. P. Suresh, P. Rajagopal and K. Balasubramaniam, Torsional Mode Ultrasonic Helical Waveguide Sensor for Re-configurable Temperature Measurement. AIP Advances, Vol. 6, 065116 (2016)
9. P. Suresh, P. Rajagopal and K. Balasubramaniam, Multiple Temperature Sensors Embedded in an Ultrasonic Spiral-like waveguide. AIP Advances, Vol. 7, 035201 (2017).
10. P. Suresh and K. Balasubramaniam, Integrated sensing system using thermocouple as an ultrasonic waveguide (Under Preparation).
11. Wilcox P., Lows M., Cawley P., The effect of dispersion on long-range inspection using ultrasonic guided waves, NDT&E international 34, pp. 1-9, 2001.
12. R. Nishanth, K. Lingadurai, P. Suresh and K. Balasubramaniam, Ultrasonic Waveguide-based Distributed Temperature Measurement on a Solid surface, INSIGHT. Vol 59. No 7. July 2017.
13. Konno, T., M. Egashira and M. Kobayashi (2015) Welding process and characteristics of fine K-type thermocouple: non-contact discharge welding for fine metal wires, *Welding International,* 29, 829-837.
14. Schreiber, E., O. L. Anderson and N. Soga (1973) Elastic constants and their measurement. New York: McGraw-Hill.
15. Sather, A (1968) Ultrasonic buffer rod technique for the high temperature measurement of the elastic moduli of the short specimens, *Journal of Acoustical Society of America,* 43, 1291-1294
16. Skoro, G. P., J. R. J. Bennett, T. R. Edgecock, S. A. Gray, A. J. McFarland, C. N Booth, K. J. Rodgers and J. J. Back (2011) Dynamic Young's Moduli of Tungsten and Tantalum at high Temperature and Stress, *Journal of Nuclear Materials,* 409, 40-46.
17. Thermocouple Specification Criteria, page 1-2 Smart Sensors Inc, 2003
18. Thermocouple Theory and Practice, page 10-40: www.labfacility.co.uk
19. Thermocouple wire soldering and Installation, *AC* 21-99 *Aircraft Wiring and Bonding*
20. Walker, B. E., C. T. Ewing and R. R. Miller (1962) Thermoelectric Instability of some Nobel Metal Thermocouples at High temperature, *Review of Scientific Instruments,* 34, 1456.
21. Walker, B. E., C. T. Ewing and R. R. Miller (1965) Study of the instability of noble metal thermocouples in vacuum, *Review of Scientific Instruments,* 36, 601-606.
22. Wang, T. P (1990) Thermocouple materials, *ASM international,* page k88-107.
23. Nishanth, K. Balasubramaniam and P. Suresh, Interpretation of Axi and Non-axi Symmetric Reflectors in the Ultrasonic Sensor Developments, IEEE Sensors, 4 Jun. 2018. DOI: 10.1109/JSEN.2018.2843531.
24. Sheen, S. H., H,-T. Chien, and A. C. Raptis, "An In-Line Ultrasonic Viscometer", Review of Progress in Quantitative Non-destructive Evaluation, Vol. 14A, pp. 1151-57, (1995).
25. Sheen, S. H., H. T. Chien and A. C. Raptis, "Measurement of shear impedances of viscoelastic fluids", IEEE Ultrasonics Symposium Proceedings, (IEEE, New York) Vol. 1, pp. 453, (1996).
26. T. K. Vogt, M. J. S. Lowe, and P. Cawley, "Measurement of the Material Properties of Viscous Liquid using Ultrasonic Guided Waves" IEEE Transaction on Ultrasonics, Ferroelectrics, and Frequency Control, Vol. 51, No. 6, pp 737-747, (2004)

PATENTS 1. 2001 Apparatus and method for high temperature viscosity and temperature measurements U.S. Pat. No. 6,296,385 B1
2. 1999 Ultrasonic buffer/waveguide EP 0935798 B1 (text from WO1998019296A1)
3. 1989—Ultrasonic temperature sensors, and ultrasonic waveguide connectors for use therewith, EP 0351050 B1
4. 1992—Distributed temperature sensor EP 0465029 A2
5. 1997—In-situ, Non-invasive, Real-time Viscosity Measurement of Molten Material with Laser Ultrasonics, U.S. Pat. No. 5,686,661
6. 1992—Marginally dispersive ultrasonic waveguide U.S. Pat. No. 5,159,838.
7. 1999—Ultrasonic path bundle and system U.S. Pat. No. 5,962,790.
8. 2009—Remote ultrasonic transducer system EP 2091669 A1 (text from WO2008060153A1)
9. 2002—Ultrasonic waveguide U.S. Pat. No. 6,400,648.
10. 1998—Clad ultrasonic waveguide with reduced trailing echoes U.S. Pat. No. 5,828,274.
11. 1996—Apparatus for determining physical properties of fluids U.S. Pat. No. 5,509,299
12. 2016—A novel waveguide technique for the simultaneous measurement of temperatures dependent properties of materials U.S patent no. US 20160153938 A1.
13. 2018—A novel ultrasonic waveguide technique for distributed sensing and measurements of physical and chemical properties of surrounding media US patent 0113030A1
14. 2017—Method and apparatus for sensing a condition in a transmission medium of electromagnetic waves U.S. Pat. No. 9,768,833
15. 2018—Novel segmented strip design for a magnetostriction sensor (MsS) using amorphous material for long range inspection of defects and bends in pipes at high temperatures US patent U.S. Ser. No. 10/073,065B2.
16. 2012—Differential ultrasonic waveguide cure monitoring probe U.S. Pat. No. 8,291,744 B2
17. 2010—Ultrasonic sensor for measuring flow rates in liquid melts EP 2158456 A2 (text from WO2008152031A2
18. 1998 U.S. Pat. No. 5,828,274
19. 2010 Ultrasonic non-destructive testing EP 2266714 A1
20. 2006 device and method for ultrasonically determining the dynamic elastic modulus of a material EP 1726947 A1
21. 2008 Device and method for ultrasonically determining the dynamic elastic modulus of a material EP 1875223 A1 (text from WO2006111559A1).

The invention claimed is:
1. An integrated sensor system for simultaneously measuring wave propagation mediums for physical properties, measuring rheology, and conditions of surrounding media, the integrated sensor system comprising:
at least two wave propagation mediums, wherein each of the at least two wave propagation mediums:
(a) comprises a metal that is dissimilar from respective metals of another of the at least two wave propagation mediums;
(b) is linked to an ultrasonic energy transducer at a first end to form a cold junction;
(c) is joined together with another of the at least two wave propagation mediums at a second end to form a hot junction made by twisting, bending, bonding, extended welding, or spot welding to provide ultrasonic damping, electrical potential, and mechanical strength; and
(d) includes a reflector between the cold junction and the hot junction including one or more bends, notches, coatings, or gratings along a length of the metal to obtain ultrasonic reflections;
wherein a gage length associated with one or more of the at least two wave propagation mediums indicates physical properties of the at least two wave propagation mediums and a surrounding medium, wherein the physical properties comprise rheology and strain parameters and are measurable using a Seebeck effect to measure ultrasonic waves propagating in the at least two wave propagation mediums in addition to temperature.
2. The sensor system as claimed in claim 1, wherein the physical properties of the surrounding medium further include cloud point or wax appearance point, pour point, density, flow, level, viscosity, mono/polymerization behavior of fluids, fluid tank/pipeline pressure, magnetic and electric fields, chemical concentrations, chemical composition, reactions, or vibrations at different temperature.

3. The sensor system as claimed in claim 1, wherein the physical properties of the surrounding medium further include viscosity, density, temperature, humidity, ice formation, flow, or level.

4. The sensor system as claimed in claim 1, wherein the physical properties of the at least two wave propagation mediums further include elastic moduli, longitudinal strains, lateral strains, radial strains, or diagonal strains.

5. The integrated sensor system as claimed in claim 1, wherein the at least two wave propagation mediums are configured to perform piezo-electric ultrasound energy transduction, electromagnetic ultrasound energy transduction, magneto strictive ultrasound energy transduction, thermo-elastic ultrasound energy transduction, opto-mechanical ultrasound energy transduction, or electromechanical ultrasound energy transduction.

6. The integrated sensor system as claimed in claim 1, wherein a temperature tolerance for measuring ultrasonic waves propagating in the at least two wave propagation mediums ranges from −100° C. to 2000° C.

7. The sensor system as claimed in claim 1, wherein two of the at least two wave propagation mediums respectively include dissimilar metals that are each compatible with each other for use in ultrasonic sensors.

8. A method of measuring physical properties of wave propagation mediums and surrounding mediums including rheology and strain parameters using ultrasonic waves propagating in waveguides in addition to temperature using an integrated sensor system, the method comprises the steps of:
   a. providing at least two wave propagation mediums, wherein each of the at least two wave propagation mediums comprises a metal that is dissimilar from respective metals of another of the at least two wave propagation mediums, and wherein each of the at least two wave propagation mediums includes one or more reflectors;
   b. joining the at least two wave propagation mediums at a first end to construct a thermocouple;
   c. placing an ultrasonic energy transducer at a second end of one or more of the at least two wave propagation mediums;
   d. arranging and securing the thermocouple in contact or embedded in an area of interest;
   e. maintaining a temperature difference between the first end and the second end of the at least two wave propagation mediums;
   f. supplying electrical energy to the ultrasonic transducer to produce mechanical vibrations that generate ultrasonic waves;
   g. transmitting the ultrasonic waves through the at least two wave propagation mediums and receiving response data by the ultrasonic transducer;
   h. observing a Seebeck effect by measuring electromotive force at the first end; and
   i. processing the response data.

9. The method as claimed in claim 8, wherein the transducer is a PZT transducer, an electromagnetic transducer, a thermal transducer, or a combination thereof.

10. The method as claimed in claim 8, wherein the integrated sensor system is spot welded or glued to a specimen for measuring the longitudinal strain, lateral strain, resultant strains or thermal expansion, wherein the specimen is heated.

11. The method as claimed in claim 8, wherein the at least two wave propagation mediums include a combination of bends, notches, and gratings around the first end, creating a star configuration, a delta configuration or a circular configuration providing directional information that includes physical properties of the specimen.

\* \* \* \* \*